P. G. PETERSON.
PAIL.
APPLICATION FILED AUG. 28, 1912.

1,051,256.

Patented Jan. 21, 1913.

Witnesses
Raymond L. Gilbert

Inventor
P. G. Peterson
By Victor J. Evans
Attorney

UNITED STATES PATENT OFFICE.

PETER G. PETERSON, OF THIEF RIVER FALLS, MINNESOTA.

PAIL.

1,051,256.  Specification of Letters Patent.  Patented Jan. 21, 1913.

Application filed August 28, 1912. Serial No. 717,591.

*To all whom it may concern:*

Be it known that I, PETER G. PETERSON, a citizen of the United States, residing at Thief River Falls, in the county of Pennington and State of Minnesota, have invented new and useful Improvements in Pails, of which the following is a specification.

The invention relates to receptacles, and more particularly to the class of milk pails. The primary object of the invention is the provision of a pail wherein milk will be thoroughly strained for removing foreign matter therefrom when it is being delivered into the pail and also which will aerate and distribute the milk entering the said pail.

Another object of the invention is the provision of a pail wherein the removable top is provided with superimposed strainers and a deflecting rim, whereby the milk entering the pail will be acted upon both by the strainers and the deflecting rim for the straining and aerating thereof, thus assuring the same sanitary and the freeing of germs and other foreign matter therefrom.

A further object of the invention is the provision of a pail of this character which is simple in construction, reliable and efficient in its purpose and inexpensive in manufacture.

With these and other objects in view the invention consists in the construction, combination and arrangement of parts as will be hereinafter more fully described, illustrated in the accompanying drawings, and pointed out in the claim hereinafter appended.

Figure 1:
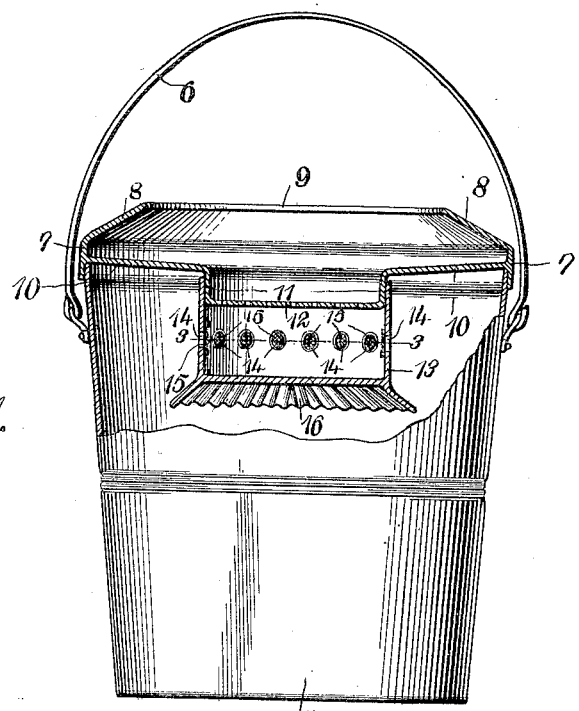
Figure 2:
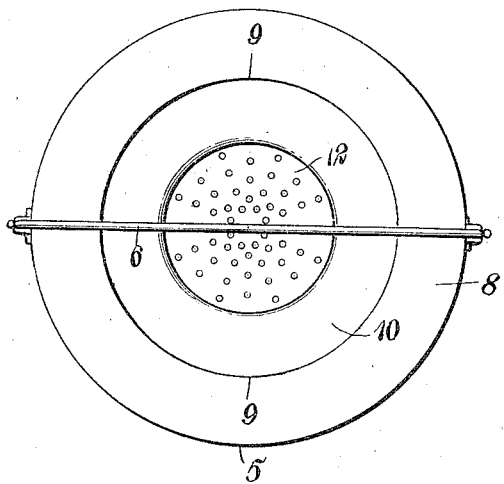
Figure 3:
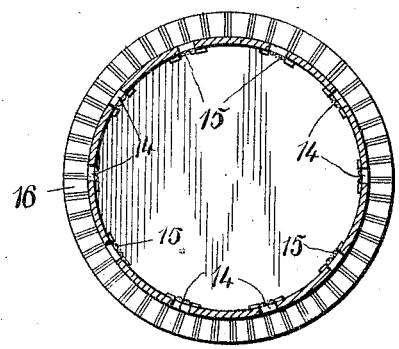

In the drawings: Figure 1 is a fragmentary vertical sectional view through the pail constructed in accordance with the invention, showing the top mounted thereon. Fig. 2 is a top plan view thereof. Fig. 3 is a sectional view on the line 3—3 of Fig. 1.

Similar reference characters indicate corresponding parts throughout the several views in the drawings.

Referring to the drawings by numerals, 5 designates a portion of a pail which is of the ordinary well-known construction, provided with the usual swinging handle 6, the side wall of the said pail being inwardly tapered as usual and in the mouth portion or open end thereof is adapted to be inserted a top presently described.

The top comprises, an annular rim 7, which is designed to telescope over the mouth edge of the pail 5, and is formed with an upwardly tapering inturned circular flange 8 providing a central opening 9, while internally connected with the inner face of the rim 7 is a hopper-shaped bottom 10, formed with a depending tubiform central column 11, provided with a coarse strainer 12, so that milk poured in the opening 9 will gravitate into the column 11 and thence percolate through the strainer 12, for removing dirt or other foreign matter from the said milk prior to the delivery of the same into the pail.

Telescoped upon the column 11 of the top is a tubular section 13, having a closed bottom and provided in the side thereof at intervals with discharge openings 14, the same being covered by wire mesh fabric 15, forming fine strainers, thus permitting the milk to flow therethrough and thence into the pail. Formed exteriorly of the tubular section 13 at the closed end thereof and exteriorly of the same is a laterally inclined corrugated aerating flange or rim 16, upon which will flow the milk, and by reason of the corrugations formed in the rim 16 the milk will be caused to flow in separate streams thereover into the pail, thus thoroughly aerating the said milk.

It will be noted that the strainers will remove insects, dirt and all foreign matter from the milk prior to the aerating of the same and its deposit within the pail, thereby assuring the contents of the pail thoroughly sanitary and clean before transportation thereof.

From the foregoing description, taken in connection with the accompanying drawings it is thought that the construction and operation of the invention will be clearly understood, and therefore, a more extended explanation has been omitted.

What is claimed is:—

The combination with a receptacle, of a top comprising a hollow body having a central depending perforated portion and an upwardly converging peripheral rim, an annular depending flange formed at the peripheral edge of said body and adapted to telescope upon the receptacle, a cylindrical section detachably engaged on the central depending portion having an imperforate bottom and having also a plurality of openings in its side, fine strainers covering the said openings in the side of the section, and a downwardly inclined corrugated rim formed on the section below the said openings in the side thereof.

In testimony whereof I affix my signature in presence of two witnesses.

PETER G. PETERSON.

Witnesses:
CHARLEY M. WILSON,
CHAS. J. LARSON.

Copies of this patent may be obtained for five cents each, by addressing the "Commissioner of Patents, Washington, D. C."